US012119605B2

(12) United States Patent
Karrasch

(10) Patent No.: US 12,119,605 B2
(45) Date of Patent: Oct. 15, 2024

(54) WIRE TERMINATION SYSTEM

(71) Applicant: TE Connectivity Solutions GmbH, Schaffhausen (CH)

(72) Inventor: Christopher John Karrasch, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 17/863,563

(22) Filed: Jul. 13, 2022

(65) Prior Publication Data

US 2024/0022034 A1 Jan. 18, 2024

(51) Int. Cl.
*H01R 43/05* (2006.01)
*H01R 43/052* (2006.01)

(52) U.S. Cl.
CPC ........... *H01R 43/05* (2013.01); *H01R 43/052* (2013.01)

(58) Field of Classification Search
CPC . H01R 43/048; H01R 43/052; Y10T 29/5313; Y10T 29/53235
See application file for complete search history.

(56) References Cited

U.S. PATENT DOCUMENTS 3,276,098 A * 10/1966 Berg ...................... H01R 43/05 29/33 M
4,114,253 A * 9/1978 Loomis .................. H01R 43/04 29/566.2
10,658,808 B2 * 5/2020 Karrasch ................ H01R 43/20
2007/0079501 A1 * 4/2007 Garner ................. H01R 43/055 29/748
2016/0094000 A1 * 3/2016 Deck ....................... H04W 4/80 29/753
2023/0231351 A1 * 7/2023 College ................ H01R 43/055 29/867
2024/0022034 A1 * 1/2024 Karrasch ............. H01R 43/055

* cited by examiner

*Primary Examiner* — Minh N Trinh

(57) ABSTRACT

A wire processing system comprises a terminal shear having an opening receiving a terminal strip including a plurality of terminals and defining a terminal strip feed path. A crimping tool or die of the system is arranged on a first side of the terminal strip feed path. A terminal gripping device is arranged on a second side of the terminal strip feed path, opposite the first side, and is adapted to grip a terminal of the terminal strip.

14 Claims, 9 Drawing Sheets

WIRE TERMINATION SYSTEM

FIELD OF THE INVENTION

The present disclosure relates to the processing of wires or cables and associated terminals, and more specifically, to an improved system for applying terminals to wires, including multi-wire cables, such as twisted pair cables.

BACKGROUND

Crimping or terminating systems for securing a terminal onto an element, such as an electrical conductor, typically include an applicator configured to feed a strip of terminals from a reel into position for crimping onto the conductor, and more specifically into a position above a lower crimping tool or die. Once the terminal is in place, an end of a wire or cable to be terminated is fed into position above or within the terminal. The terminal may be separated from the strip of terminals using a shear depressor attached to the movable end of an applicator ram used to drive an upper crimping die. As the applicator ram is moved, the depressor engages with a passive terminal shear or shear tool which shears the terminal from the strip just after the terminal is captured in the crimping tooling.

While effective for use with single wires, the above-described arrangement is not well-suited for use with multi-wire cables, such as twisted pair cables. Specifically, in multi-wire cable applications, the wire ends may only extend beyond the cable (e.g., its jacket) a relatively short distance due to the requirements of the final terminated assemblies. This creates difficulty in placing the individual ends within the applicator during crimping operations. In addition to being difficult to accurately place during termination, further problems arise due to requirements that the pair of discrete wires must remain in closed proximity to each other to prevent signal noise. Specifically, in above-described crimping process, the pair of wires may be pre-formed into a shape that creates enough space for the crimp tooling. This separation, however, is greater than the final spacing in the connector and greater than the allowable spacing between the wires for signal integrity. Thus, the wires need to be reformed after crimping to locate them in closer proximity to each other. This reforming process may result in length discrepancy between the wire pair or internal stresses causing the wires to flex too far apart. Further, the formed wires are not individually supported or controlled during crimping. Depending on the stiffness of the wire, drooping may occur which may affect the repeatability of accurate wire placement within the terminal. While wire positioning devices may be implemented in an effort to accurately position wires prior to crimping, these devices are often not compatible, or practically implemented, with existing applicator and terminal shear arrangements.

Improved systems and methods addressing these deficiencies are desired.

SUMMARY

In one embodiment of the present disclosure, a wire processing system comprises a terminal shear having an opening receiving a terminal strip including a plurality of terminals and defining a terminal strip feed path. A crimping tool or die of the system is arranged on a first side of the terminal strip feed path. A terminal gripping device is arranged on a second side of the terminal strip feed path, opposite the first side, and is adapted to grip a terminal of the terminal strip.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
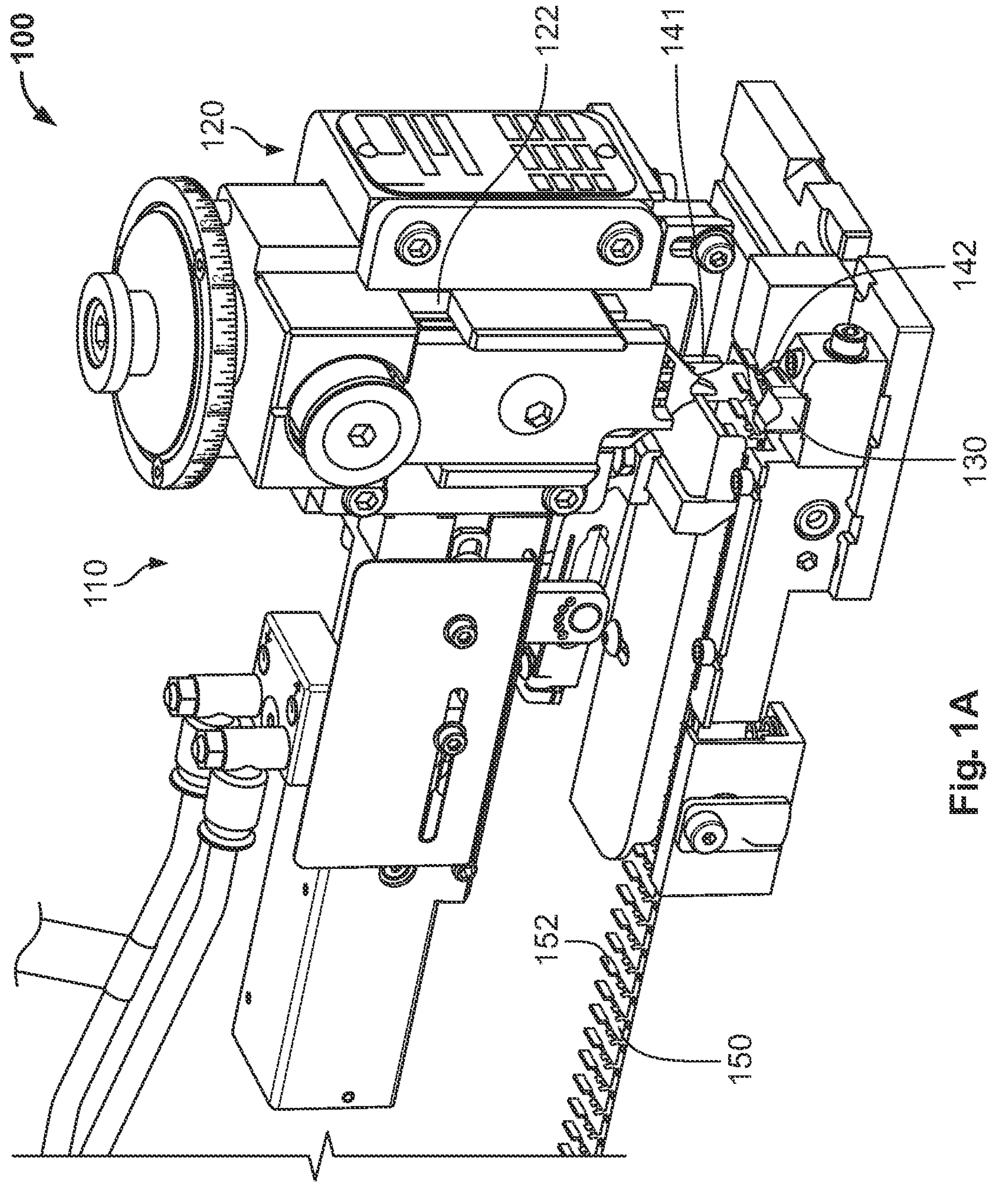
FIG. 1A is a front perspective view of a terminal applicator useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
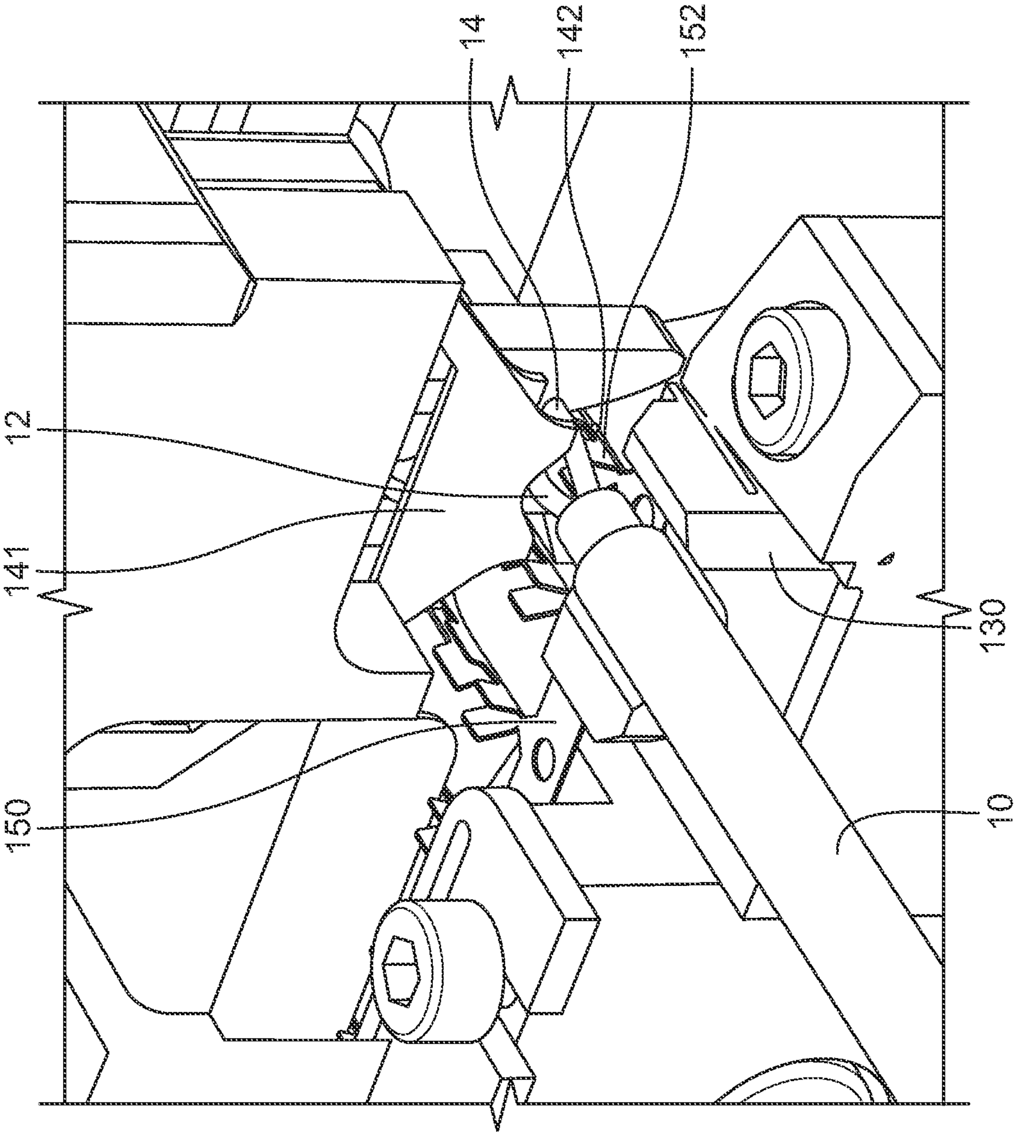
FIG. 1B is a partial front perspective view of the terminal applicator of FIG. 1A with an exemplary wire or cable inserted therein.

Referring generally to FIGS. 1A and 1B, an exemplary crimping system 100 useful for describing embodiments of the present disclosure is shown. The crimping system 100 generally includes an applicator or applicator assembly 110, a ram assembly 120, a terminal shear 130 and opposing crimping tooling or dies 141, 142. The system 100 is adapted to crimp a terminal 152 sheared from a terminal strip or carrier 150 including a plurality of interconnected terminals onto the end(s) of a wire or cable. Specifically, the terminal applicator 110 is adapted to feed a terminal 152 of the terminal strip 150 into a crimping position between a movable upper crimping die 141 and an opposing stationary lower die 142. The upper crimping die 141 is fixedly connected to a movable end of an applicator ram or crimping actuator 122. As shown, the applicator ram 122 may include, for example, one or more pneumatic or hydraulic cylinders or a motor-driven mechanism for selectively moving the crimping die 141 in the vertical direction(s). During a termination sequence, the ram assembly 120 lowers to separate the terminal 152 from the strip 150 via the terminal shear 130, and crimp the terminal 152 onto a free end of a wire or cable inserted therein via the crimping dies 141, 142. As shown in FIG. 1B, when used to crimp a terminal to a wire 12 of a twisted pair cable 10 including two wires 12, 14, the applicator 110 feeds a terminal 152 along a feed path to the point of termination above the lower crimp tooling 142. In a typical application, the prepped twisted pair cable 10 is hand placed in the termination area through an opening in a guard. This makes is difficult to precisely position the individual wires 12, 14 relative to the terminal. The size of the cable 10 relative to the individual wires also interferes with the terminal shear 130 that sits between the terminal 152 and the machine's operator. An individual wire 14 that is not being terminated can also interfere with the crimp tooling 141, 142 and may be damaged if not handled and positioned correctly.

Figure 2:
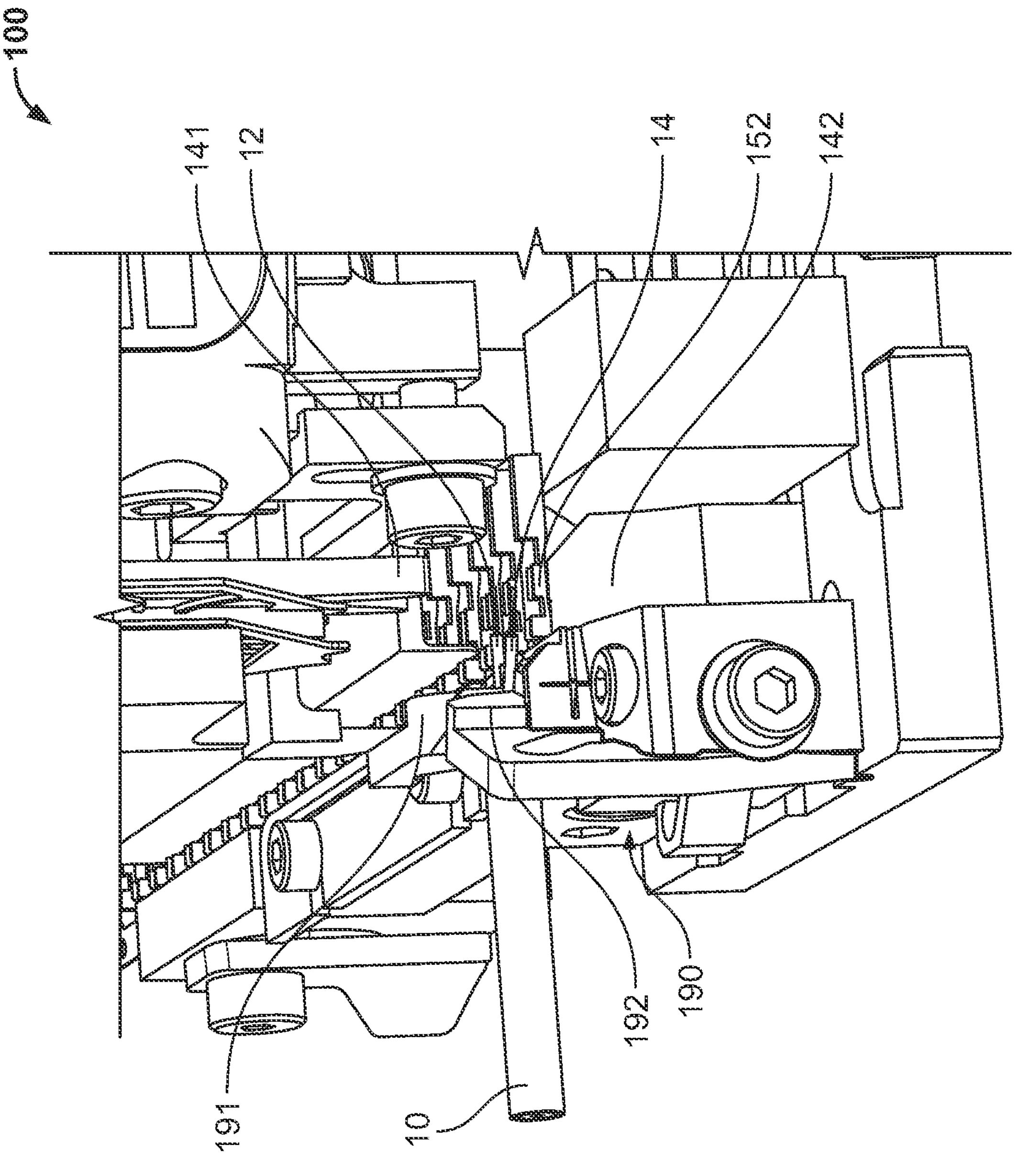
FIG. 2 is a side perspective view of the terminal applicator of FIG. 1B.

As shown specifically in FIG. 2, in order to remedy these shortcomings, a wire processing or positioning device or assembly 190 may be used to orient the wires 12, 14 of the cable 10 into crimping positions between the above-described upper and lower crimping dies 141, 142. As shown, the positioning device 190 biases or displaces the other wire 14 out of a crimping zone via relative rotation between the wires. The device 190 includes a a first gripper 191 adapted to grip the first wire 12 of a cable 10, and a second gripper 192 movable relative to the first gripper and operable independent of the first gripper to grip the second wire of the cable.

Still referring to FIGS. 1A-2, in some terminal applications, the terminal carrier strip 150 which locates and orients the terminals 152 prior to crimping is located between a wire crimp barrel of the terminal 152 and the front of the machine. This is referred to as a front carrier strip. The use of a front carrier strip necessitates that the terminal shear 130 is located on the side of the applicator 110 where the cable 10 is presented or inserted for termination. This is also referred to as a front shear. The use of a front shear applicator 110 is problematic in that, for example, the wire positioning device 190 of FIG. 2 interferes with the terminal shear 130, as illustrated. Thus, it is not possible to properly position (i.e., in close enough proximity) the wire positioning device 190 relative to the applicator 110.

Embodiments of the present disclosure enable the use of a wire positioning device, such as the wire positioning device 190 shown in FIG. 2, thus preventing damage to the wire, cable, or terminated connectors. More specifically, embodiments of the present disclosure remove the existing terminal shear 130 from in front of the lower crimp tooling 142 to allow the positioning device 190 to be correctly positioned for placing the wires 12, 14 accurately for termination. In use, front carrier mounted terminals are fed in back of the lower tooling or ram. In embodiments, a gripping mechanism is provided which lowers to the terminal height then closes to grip the terminal. Once gripped, a rear mounted terminal shear is actuated via an air cylinder, cam, pivot arms and shaft to separate the terminal from the terminal carrier strip. A transfer mechanism then moves the grippers forward to position the terminal over the lower crimp tooling for termination.

Figure 3A:
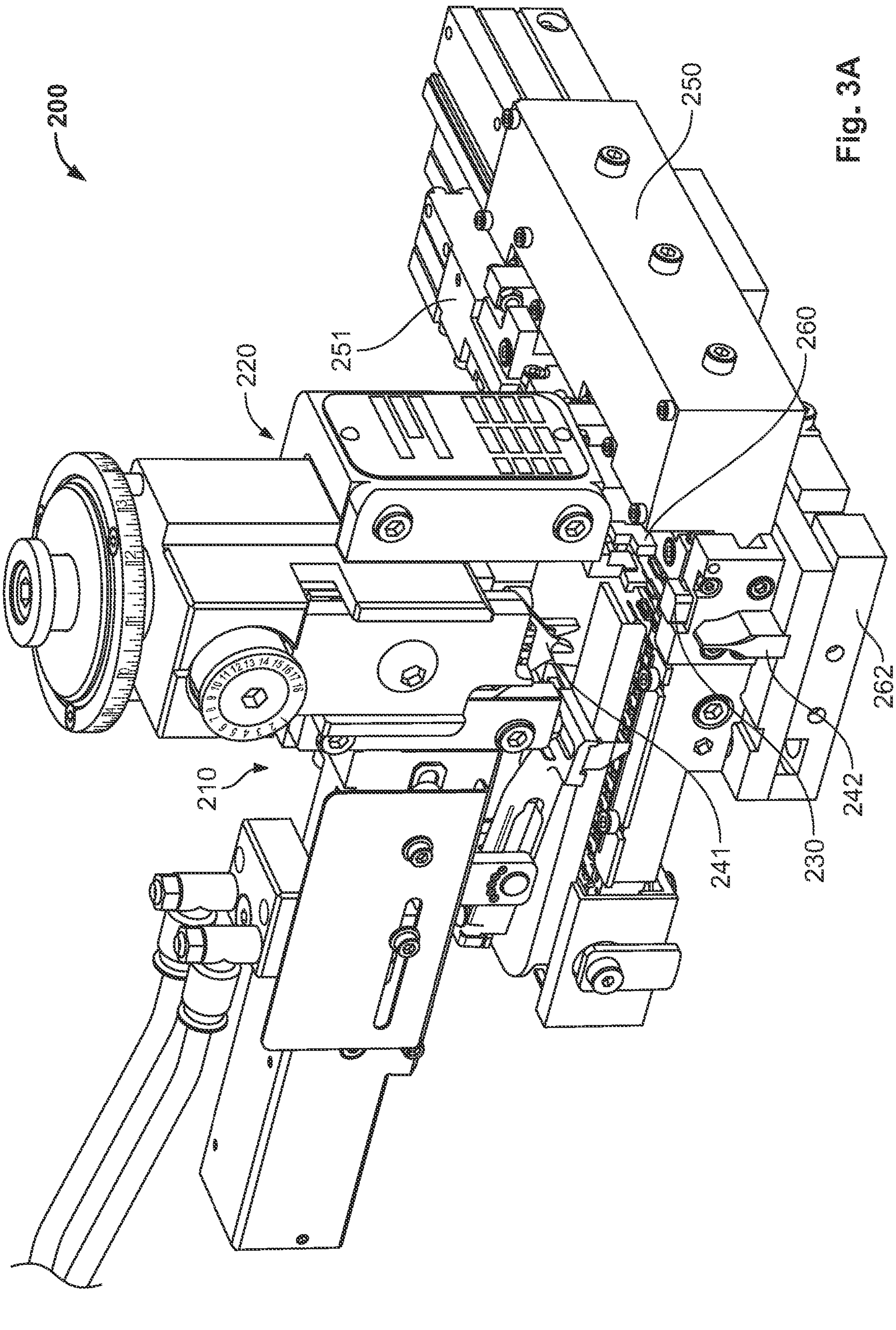
FIG. 3A is a front perspective view of a terminal applicator system according to an embodiment of the present disclosure.
Figure 3B:
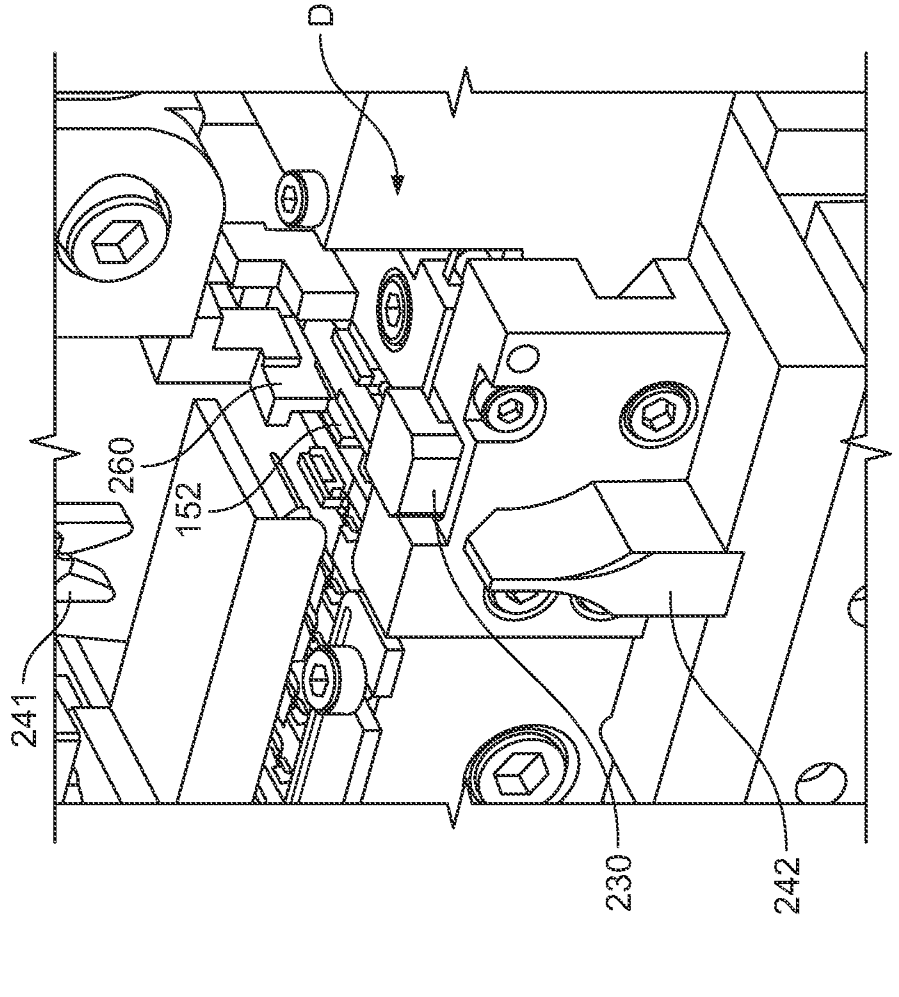
FIG. 3B is a partial front perspective view of the terminal applicator system of FIG. 3A.

More specifically, and referring now to FIGS. 3A and 3B, an applicator system or assembly 200 according to an embodiment of the present disclosure includes a rear shear for front carrier strips designed to separate a terminal from a carrier strip behind the lower crimping tooling. The assembly 200 includes an applicator 210 including a ram 220, a shear tool 230, upper and lower crimp tooling 241, 242 and a terminal shear/grip and transfer mechanism 250 for operating the terminal shear 230 and a gripper mechanism 260 of the system. All or a portion of the above components are mounted on a base plate 262. As shown, the operative portion of the terminal shear 230 has been relocated behind the lower crimp tooling or die 242 (i.e., rear shear), as distinct from the front shear arrangements of prior art assemblies, and as shown and described with respect to FIGS. 1A-2.

Figure 4:
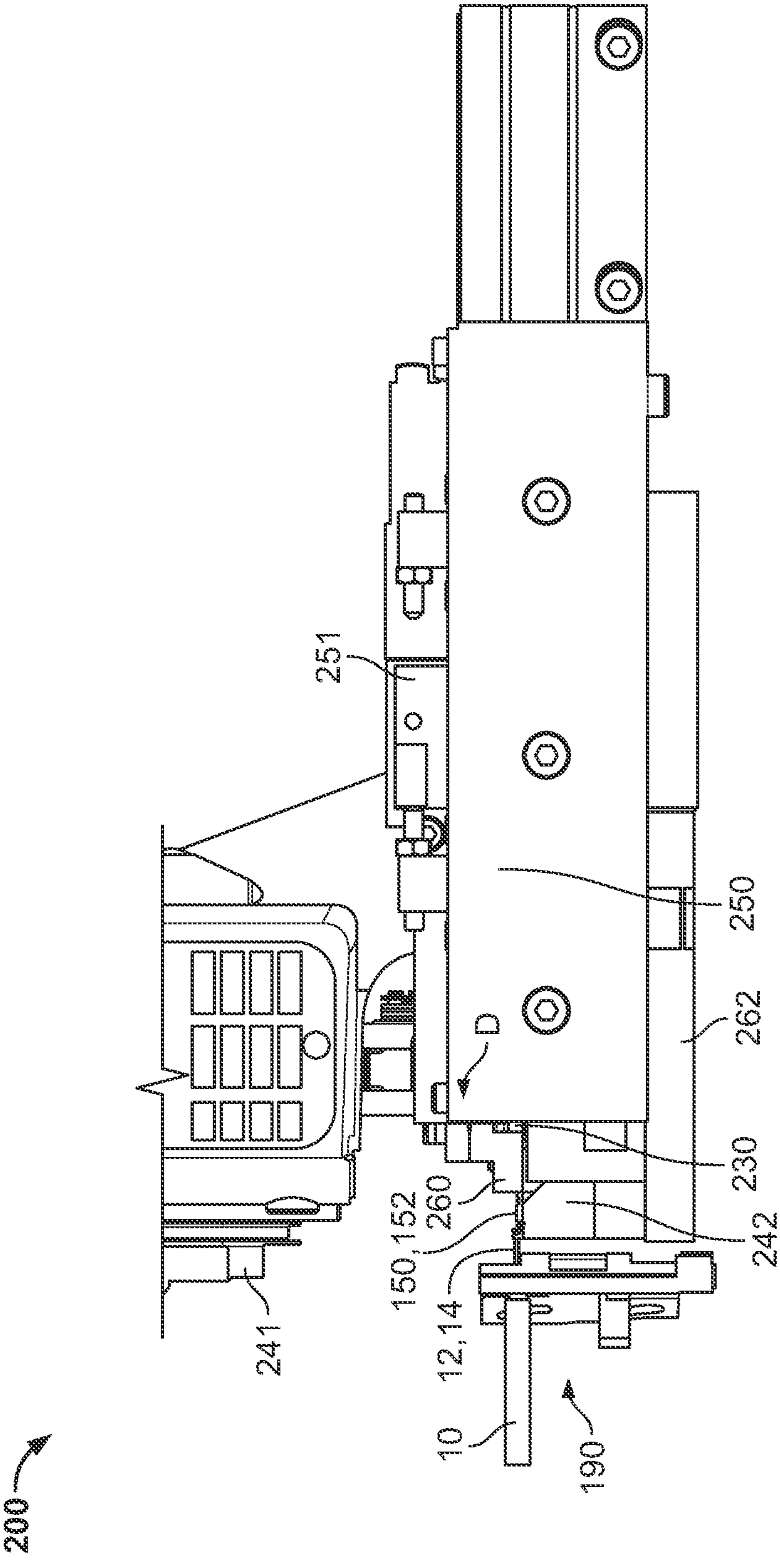
FIG. 4 is side perspective view of the terminal applicator system of FIG. 3A with an exemplary wire or cable inserted therein.

FIG. 4 is a side view of the applicator system 200 which illustrates the cable 10 inserted therein. As a result of the relocation of the terminal shear 230 to behind the crimping die 242, the base 262 may be shortened. This permits improved placement of the wire positioning assembly 190 for holding and locating the wires 12, 14 of the cable 10. Specifically, the assembly 190 may be positioned directly adjacent to the lower crimping die 242. This arrangement increases accuracy and efficiency of the wire placement, reducing the above-described crimping errors and other associated drawbacks of manual or un-aided wire placement.

As can be further visualized in FIG. 4, the gripper mechanism 260 is used to feed the terminals 152 from behind the lower crimping die 242 and toward the lower crimping die 242 in the indicated direction D. Specifically, the gripper mechanism 260 is lowered onto a terminal 152 and grips or holds the terminal as it is sheared from the strip 150. After shearing, the transfer mechanism 250 moves the gripper mechanism 260 and terminal 152 forward to the termination position above the lower tooling 242. It should be understood that a gripped and separated terminal 152 may be moved into the terminating position above the lower crimping tool 242 by another actuator, such as a linear actuator 251 incorporated into the mechanism 250 and attached to the gripper mechanism 260.

Figure 5:
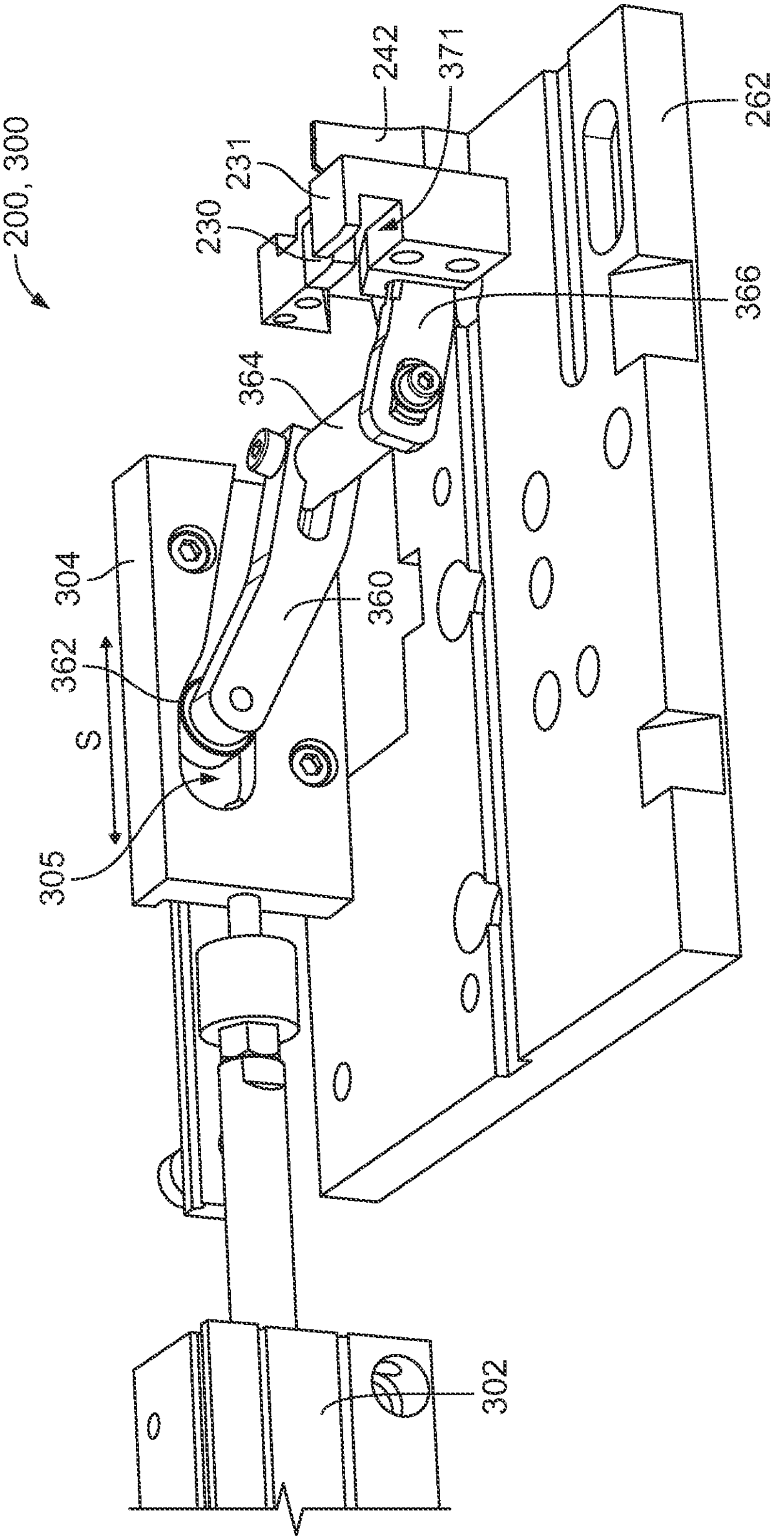
FIG. 5 is a side perspective view of a terminal shear and terminal shear drive assembly according to an embodiment of the present disclosure.
Figure 6:
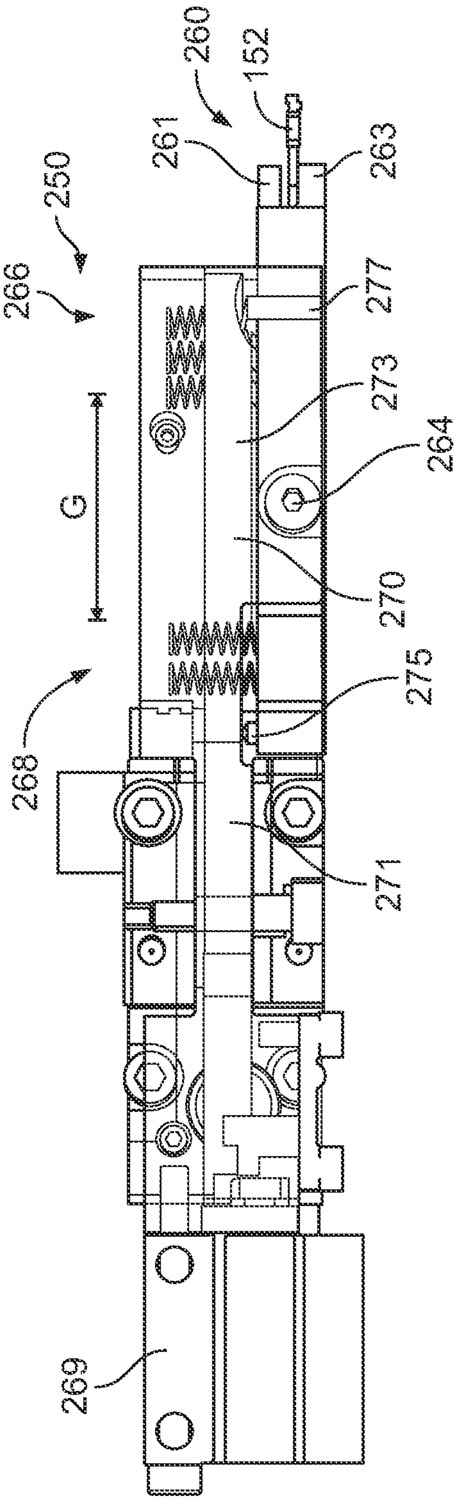
FIG. 6 is a top view of a terminal gripping mechanism according to an embodiment of the present disclosure in a closed or gripping position.

FIG. 5 illustrates an actuator or drive assembly or mechanism 300 of the system 200 used to drive the rear shear tool 230. The exemplary mechanism 300 includes a linear actuator 302 for selectively driving a shear cam 304 in the indicated directions S. The cam 304 includes an opening 305 defining a cam surface. A cam arm 360 includes a cam follower 362 (e.g., a roller cam follower) engaged within the opening 305 and the associated cam surface. A rotatable pivot shaft 364 is fixedly connected to an end of the cam arm 360. A shear arm 366 is fixedly connected to an end of the pivot shaft 364. The movable shear tool 230 is attached to the shear arm 366 and is operative to, in conjunction with a fixed tool 231, shear a carrier strip from a terminal. Specifically, the shear tools 230, 231 define an opening 371 formed therethrough for receiving the terminal strip 150 prior to shearing. The shear tool 230 is lowered when the actuator 302 extends or retracts to rotate the pivot shaft 364 through the cam follower 362 and cam arm 360. The rotation of the pivot shaft 364 causes a movement of the shear arm 366 which lowers the shear 230 to separate a terminal from the strip. This process is distinction from the above-described prior art, which drives a shear downward by the movement of the applicator ram during the termination process. It should be understood that the opening 371 generally defines a feed path of a terminal strip (i.e., the terminal strip 150) therethrough. The feed path is oriented transverse to the insertion direction of the cable 10, as shown in FIG. 4, as well as transverse to the translational directions D,S of the gripper mechanism 260 and shear cam 304, respectively.

Referring now to FIGS. 6-9, the gripping and/or transfer mechanism 250 will be described in further detail. As shown particularly in FIGS. 6 and 7, the gripper mechanism 260 includes opposing inner and outer grippers 261, 263 used to grip the terminal 152 therebetween, as described above. In the exemplary embodiment, the grippers 261, 263 are movable or pivotable with respect to one another in a scissor-like manner about an intermediate pivot point 264. Each of the grippers 261, 263 may be biased into the closed position shown in FIG. 6 via respective return spring(s) 266, 268 (e.g., a plurality of compression springs) acting laterally on each arm of a respective gripper.

Figure 7:
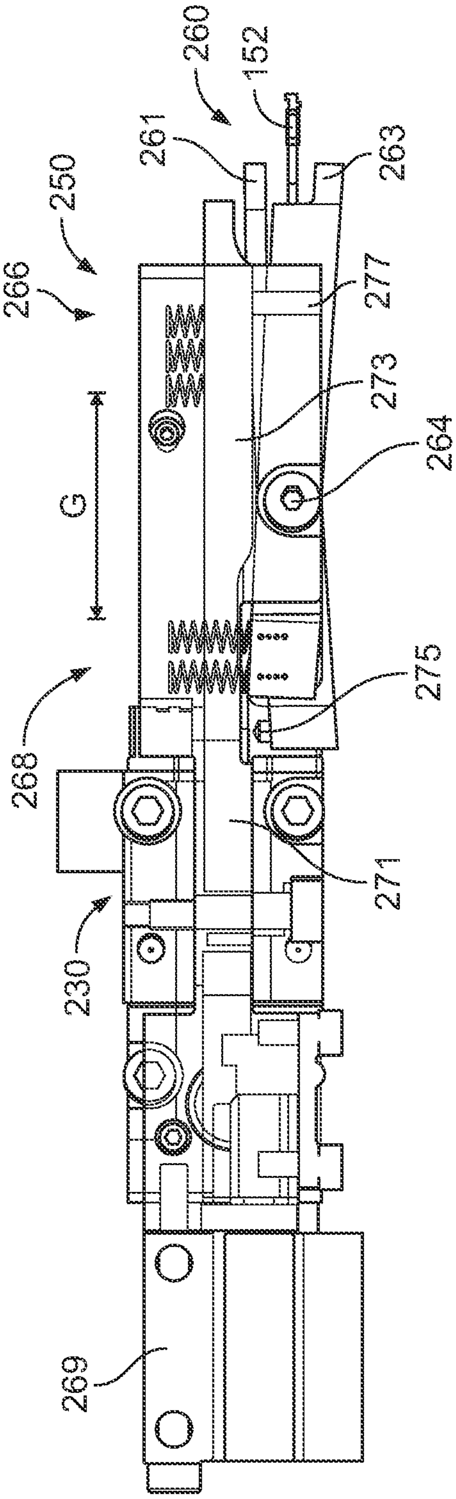
FIG. 7 is a top view of the terminal gripping mechanism of FIG. 6 in an open position.

The grippers 261, 263 are biased into an open position, as shown in FIG. 7, against the elastic return force applied by the springs 266, 268 via a cam or cam shaft 270 attached to a movable end of a linear actuator 269. Specifically, the cam 270 is selectively movable along the indicated directions G via the actuator 269. The cam 270 defines cam surfaces 271, 273 which engage adjustment screws 275, 277 or cam followers fixed to each arm of the grippers 261, 263, respectively as the actuator 269 and cam 270 are extended. When the cam 270 is retracted, the springs 266, 268 return the grippers 261, 263 to the closed position of FIG. 6. As shown, altering a length of each adjustment screw 275, 277 is operative to alter the extent to which each gripper is biased (i.e., how far the gripper is opened and/or closed).

Figure 8:
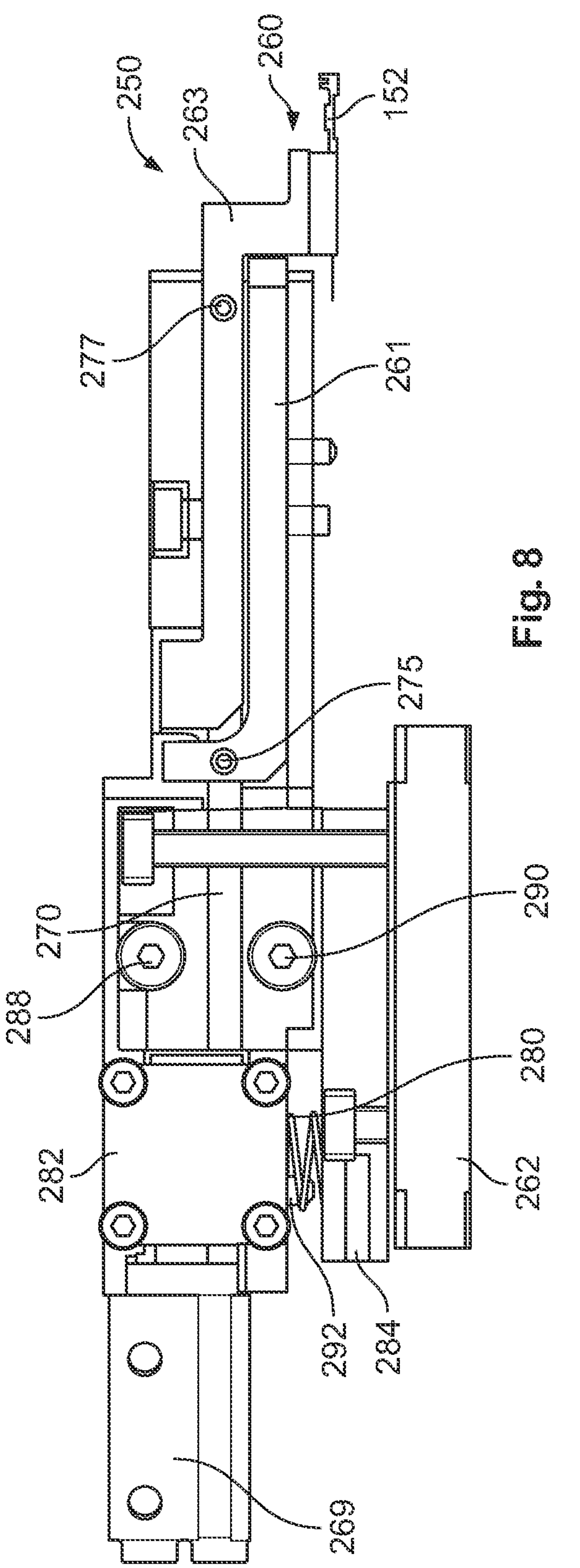
FIG. 8 is a side view of the terminal gripping mechanism of FIGS. 6 and 7 in a lowered and closed position.
Figure 9:
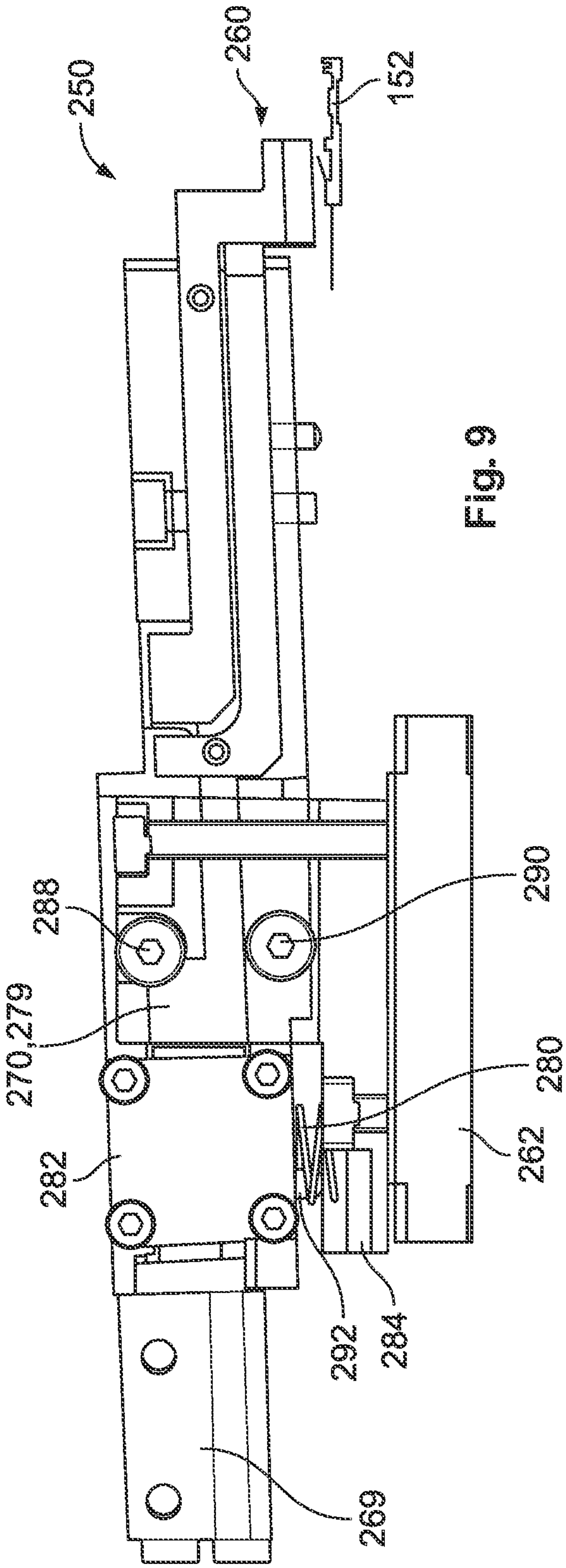
FIG. 9 is a side view of the terminal gripping mechanism of FIG. 8 in a raised and open position.

Referring now to FIGS. 8 and 9, during an exemplary termination or crimping operation according to embodiments of the present disclosure, the gripper mechanism 260 is capable of being lifted vertically from a lowered position (FIG. 8) to a raised position (FIG. 9) in order to permit a terminal 152 and/or strip 150 to be fed thereunder via the applicator 110, and into position for gripping by the grippers 261, 263. In the exemplary embodiment, the gripper mechanism 260 is lifted and lowered as the cam 270 is extended and retracted, respectively. In this way, when the gripper mechanism 260 is lowered with a terminal 152 in position to be gripped, as shown in FIG. 8, the gripper mechanism closes automatically under the return force of the springs 266, 268.

As shown, a spring 280 (i.e., a compression spring) is provided between a body 282 of the mechanism 250 and, for example, the base 262 or a transfer block 284 attached to the base. The spring 280 biases the gripper mechanism 260 into the lowered position shown in FIG. 8 with the cam 270 in a retracted position. As the gripper cam 270 extends to open the gripper mechanism 260, a protrusion 279 on the gripper cam engages a stop screw 288 mounted on the transfer block 284. The force exerted on the stop screw 288 creates a torque about a pivot screw or joint 290, which rotates the gripper mechanism 260 about the pivot screw, raising it, until an adjustment screw 292 contacts the transfer block 284. When used in conjunction with the above-described actuator 251, the gripper mechanism 260 is operative to grip a terminal as it is sheared from the strip, and transfer the sheared terminal over the shear and into a termination position above the lower crimp tooling 242 for subsequent crimping.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal applicator system, comprising:

an applicator having a crimping actuator and a pair of opposing crimping dies including a movable upper die mounted to a movable end of the crimping actuator and a stationary lower die, the applicator feeding a strip of terminals along a feed path extending in a first direction;

a terminal gripping mechanism adapted to grip a terminal of the terminals fed by the applicator into a gripping position adjacent the stationary lower die, the terminal gripping mechanism arranged on a side of the feed path opposite the stationary lower die in a second direction transverse to the first direction; and a terminal shear arranged between the stationary lower die and the terminal gripping mechanism in the second direction and receiving the strip of terminals fed by the applicator.

2. The system of claim 1, further comprising a wire processing device mounted adjacent the stationary lower die on a side opposite the terminal shear in the second direction, the processing device including a first gripper adapted to grip a first wire of a cable, and a second gripper adapted to grip a second wire of the cable.

3. The system of claim 1, wherein the terminal shear defines a slot opening in a direction of the terminal gripping mechanism.

4. The system of claim 1, wherein the terminal gripping mechanism grips a terminal of the terminals in the gripping position and extends the terminal in the second direction to a terminating position above the lower die.

5. The system of claim 4, further comprising an actuator for translating the terminal gripping mechanism in the second direction.

6. The system of claim 4, further comprising a gripper actuator for opening and closing opposable ends of the terminal gripping mechanism.

7. The system of claim 6, wherein the terminal gripping mechanism raises to permit the strip of terminals to be fed into the gripping position by the applicator.

8. The system of claim 7, wherein the opposable ends of the terminal gripping mechanism are automatically biased into an open position as the terminal gripping mechanism is moved into a raised position, and automatically biased into a closed position as the terminal gripping mechanism is moved into a lowered position.

9. The system of claim 8, wherein the terminal gripping mechanism is biased into the lowered position, and the opposable ends of the terminal gripping mechanism are biased into the closed position, by a plurality of elastic elements of the terminal gripping mechanism.

10. The system of claim 6, further comprising a gripper cam operatively connected to the gripper actuator for biasing the opposable ends of the terminal gripping mechanism between open and closed positions.

11. The system of claim 10, wherein motion of the gripper cam raises the terminal gripping mechanism.

12. The system of claim 4, wherein a wire of a cable is received by a terminal of the strip of terminals arranged in the terminating position in a direction opposite the second direction.

13. The system of claim 1, wherein the terminal shear is driven by a shear actuator independent of the crimping actuator.

14. The system of claim 13, wherein the shear actuator includes a linear actuator operatively connected to a shear cam for selectively raising and lowering the terminal shear and separating a terminal of the strip of terminals from the terminal strip.

* * * * *